US009183102B2

(12) United States Patent
Bauer et al.

(10) Patent No.: US 9,183,102 B2
(45) Date of Patent: Nov. 10, 2015

(54) HARDWARE CONSUMPTION ARCHITECTURE

(75) Inventors: Eric J. Bauer, Freehold, NJ (US); Randee S. Adams, Naperville, IL (US); William D. Reents, Middlesex, NJ (US); Mark M. Clougherty, Chatham, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 688 days.

(21) Appl. No.: 13/250,188

(22) Filed: Sep. 30, 2011

(65) Prior Publication Data

US 2013/0086411 A1   Apr. 4, 2013

(51) Int. Cl.
| | |
|---|---|
| *G06F 11/00* | (2006.01) |
| *G06F 11/20* | (2006.01) |
| *G06F 11/30* | (2006.01) |
| *G06F 11/14* | (2006.01) |
| *G06F 11/16* | (2006.01) |

(52) U.S. Cl.
CPC .......... *G06F 11/2041* (2013.01); *G06F 11/008* (2013.01); *G06F 11/2035* (2013.01); *G06F 11/3051* (2013.01); *G06F 11/1484* (2013.01); *G06F 11/1666* (2013.01); *G06F 11/20* (2013.01)

(58) Field of Classification Search
CPC ............ G06F 11/2041; G06F 11/3051; G06F 11/008; G06F 11/2035; G06F 11/20; G06F 11/1484; G06F 11/1666
USPC ............................................. 714/4.2, 3, 47.3
See application file for complete search history.

(56) References Cited

U.S. PATENT DOCUMENTS

| | | | | |
|---|---|---|---|---|
| 5,121,394 | A * | 6/1992 | Russell | 714/724 |
| 5,530,302 | A * | 6/1996 | Hamre et al. | 307/147 |
| 5,740,378 | A * | 4/1998 | Rehl et al. | 710/302 |
| 5,881,251 | A * | 3/1999 | Fung et al. | 710/302 |
| 5,953,216 | A * | 9/1999 | Farnworth et al. | 361/777 |
| 6,487,624 | B1 * | 11/2002 | Erickson et al. | 710/302 |
| 7,966,519 | B1 * | 6/2011 | Aggarwal et al. | 714/10 |
| 2005/0172164 | A1 * | 8/2005 | Fox et al. | 714/13 |
| 2006/0036889 | A1 * | 2/2006 | Arai | 714/1 |

(Continued)

FOREIGN PATENT DOCUMENTS

| | | |
|---|---|---|
| JP | 2008152594 | 7/2008 |
| JP | 200970142 | 4/2009 |

(Continued)

*Primary Examiner* — Yair Leibovich
(74) *Attorney, Agent, or Firm* — Kramer & Amado, P.C.

(57) ABSTRACT

Various exemplary embodiments relate to a method and related network node including one or more of the following: identifying a hardware failure of a failed component of a plurality of hardware components; determining a set of agent devices currently configured to utilize the failed component; reconfiguring an agent device to utilize a working component of the plurality of hardware components. Various exemplary embodiments additionally or alternatively relate to a method and related network node including one or more of the following: projecting a failure date for the hardware module; determining whether the projected failure date is acceptable based on a target replacement date for the hardware module; if the projected failure date is not acceptable: selecting a parameter adjustment for a hardware component, wherein the parameter adjustment is selected to move the projected failure date closer to the target replacement date, and applying the parameter adjustment to the hardware component.

37 Claims, 9 Drawing Sheets

(56) References Cited

U.S. PATENT DOCUMENTS

| | | | |
|---|---|---|---|
| 2008/0005539 A1 | 1/2008 | Velhal et al. | |
| 2008/0094810 A1* | 4/2008 | Lajara et al. | 361/759 |
| 2008/0266813 A1* | 10/2008 | Carlisi et al. | 361/727 |
| 2009/0157851 A1* | 6/2009 | Dake et al. | 709/220 |
| 2009/0212813 A1* | 8/2009 | Hu et al. | 326/8 |
| 2009/0259861 A1* | 10/2009 | Tune | 713/320 |
| 2009/0279423 A1* | 11/2009 | Suresh et al. | 370/216 |
| 2009/0282235 A1* | 11/2009 | Perng et al. | 713/2 |
| 2009/0287909 A1* | 11/2009 | Vera et al. | 712/220 |
| 2010/0100765 A1* | 4/2010 | Vingralek | 714/6 |
| 2011/0289205 A1* | 11/2011 | Hansson et al. | 709/224 |
| 2012/0188078 A1* | 7/2012 | Soles et al. | 340/540 |

FOREIGN PATENT DOCUMENTS

| | | |
|---|---|---|
| JP | 2011128967 | 6/2011 |
| JP | 2011134010 | 7/2011 |
| WO | 2010140183 A1 | 12/2010 |

* cited by examiner (SHEET 1 OF 2)

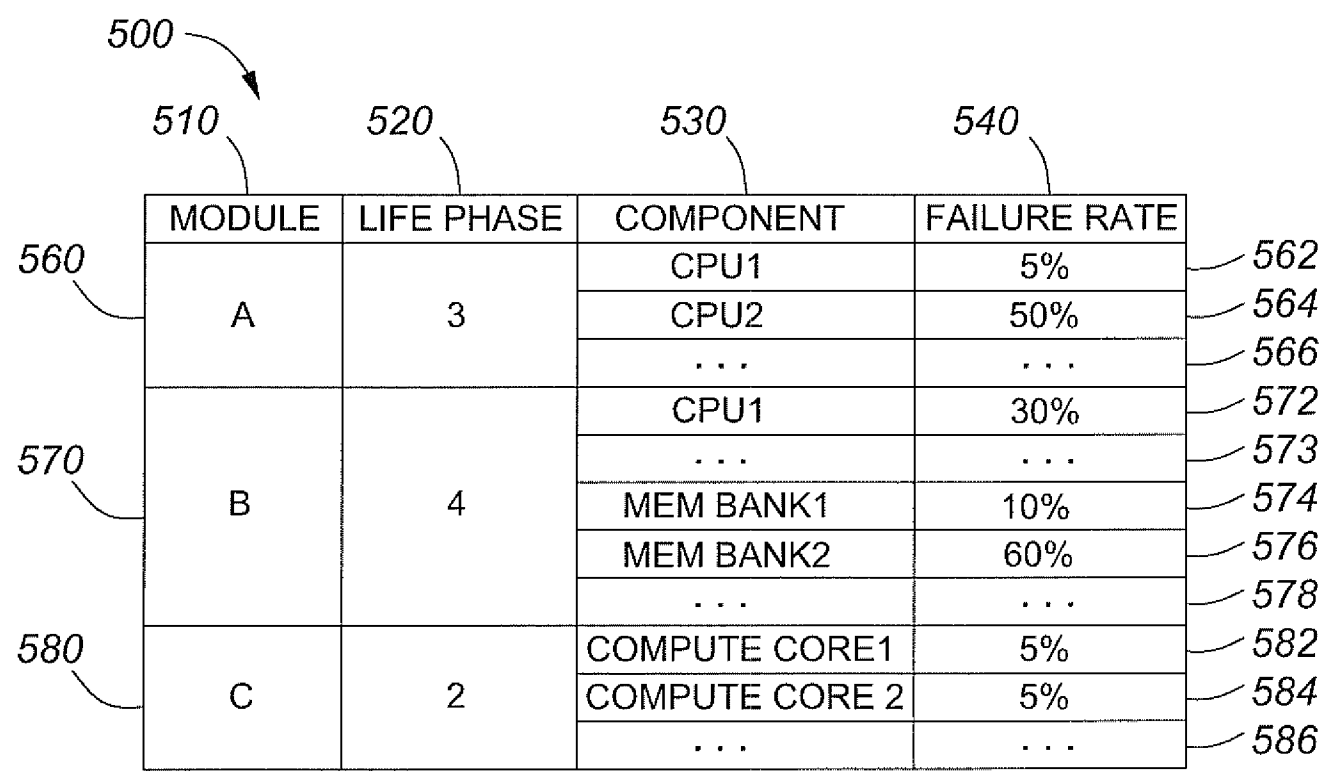

| MODULE | LIFE PHASE | COMPONENT | FAILURE RATE |
|---|---|---|---|
| A | 3 | CPU1 | 5% |
|   |   | CPU2 | 50% |
|   |   | ... | ... |
| B | 4 | CPU1 | 30% |
|   |   | ... | ... |
|   |   | MEM BANK1 | 10% |
|   |   | MEM BANK2 | 60% |
|   |   | ... | ... |
| C | 2 | COMPUTE CORE1 | 5% |
|   |   | COMPUTE CORE 2 | 5% |
|   |   | ... | ... |

FIG. 5

HARDWARE CONSUMPTION ARCHITECTURE

CROSS-REFERENCE TO RELATED APPLICATIONS

This application cross-references the following co-pending application, incorporated by reference herein, in its entirety: application Ser. No. 13/250,333, "LIVE MODULE DIAGNOSTIC TESTING" to Bauer et al.

TECHNICAL FIELD

Various exemplary embodiments disclosed herein relate generally to system reliability and availability.

BACKGROUND

The rise of technologies such as virtualization and cloud computing has facilitated moving various applications previously associated with dedicated and standalone hardware onto machines providing shared hardware resources. This so-called "server consolidation" allows for a fuller utilization of available resources and, therefore, a decreased cost associated with underutilized resources. For example, energy consumption, floor space, and other server costs may be reduced by retiring servers that were previously only lightly utilized.

Server consolidation can lead to various unwanted effects, however. The increased utilization of hardware resources can increase the hardware's failure rate. These failures may then impact applications utilizing the hardware. Further, under current architectures, when a hardware component of a field replaceable unit (FRU), such as a blade or rack mount server fails, the, unit often must be replaced or repaired, removing the resources associated with the unit from the pool of resources available for application execution, even though most hardware components of the server may remain operational.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a hardware management device for enabling incremental failure of a hardware system, the hardware system including a plurality of hardware components, the method including one or more of the following: identifying a hardware failure of a failed component of the plurality of hardware components; determining set of agent devices currently configured to utilize the failed component; and for at least one agent device of the set of agent devices, reconfiguring the agent device to utilize a working component of the plurality of hardware components in place of the failed component; and deactivating the failed component, wherein other hardware components of the plurality of hardware components remain in operation.

Various exemplary embodiments relate to a hardware system capable of incremental hardware failure, the hardware system including: a circuit board; a plurality of hardware components mounted on the circuit board; and a management device that, during run time, deactivates at least one hardware component of the plurality of hardware components while at least one remaining component of the plurality of hardware components remains in operation.

Various exemplary embodiments relate to a tangible and non-transitory machine-readable storage medium encoded with instructions for execution by a hardware management device for enabling incremental failure of a hardware system, the hardware system including a plurality of hardware components, the tangible and non-transitory machine-readable storage medium including one or more of the following: instructions for identifying a hardware failure of a failed component of the plurality of hardware components; instructions for determining set of agent devices currently configured to utilize the failed component; and instructions for, for at least one agent device of the set of agent devices, reconfiguring the agent device to utilize a working component of the plurality of hardware components in place of the failed component; and instructions for deactivating the failed component, wherein other hardware components of the plurality of hardware components remain in operation.

Various exemplary embodiments additionally include reconfiguring the hardware module to power down the failed component while continuing to provide power to at least one other component of the plurality of hardware components.

Various exemplary embodiments are described wherein the hardware system is a hardware module including a circuit board upon which the plurality of hardware components is mounted.

Various exemplary embodiments are described wherein all hardware components mounted on the circuit board are of a single type of hardware component.

Various exemplary embodiments are described wherein the hardware management device includes a hypervisor and wherein the hardware management device utilizes at least one component of the plurality of hardware components to operate.

Various exemplary embodiments are described wherein the hardware management device includes a cloud computing gateway device and wherein: the cloud management device manages a plurality of hypervisors; and a first hypervisor of the plurality of hypervisors manages the plurality of hardware components.

Various exemplary embodiments additionally include, for at least one agent device of the set of agent devices, reconfiguring the agent device to be managed by a second hypervisor of the plurality of hypervisors.

Various exemplary embodiments relate to a method performed by a hardware management device for controlling consumption of a hardware module, the hardware module including a plurality of hardware components, the method including one or more of the following: projecting a failure date for the hardware module; determining whether the projected failure date is acceptable based on a target replacement date for the hardware module; if the projected failure date is not acceptable: determining at least one parameter adjustment for at least one hardware component of the plurality of hardware components, wherein the at least one parameter adjustment is selected to move the projected failure date closer to the target replacement date, and applying the at least one parameter adjustment to the at least one hardware component of the plurality of hardware components.

Various exemplary embodiments relate to a hardware management device for controlling consumption of a hardware module, the hardware module including a plurality of hardware components, the hardware management device including one or more of the following: a consumption policy engine configured to: project a failure date for the hardware module, and determine whether the projected failure date is acceptable based on a target replacement date for the hardware module; and a parameter adjuster that is configured to, if the projected failure date is not acceptable: determine at least one parameter adjustment for at least one hardware component of the plurality of hardware components, wherein the at least one parameter adjustment is selected to move the projected failure date closer to the target replacement date, and apply the at least one parameter adjustment to the at least one hardware component of the plurality of hardware components.

Various exemplary embodiments relate to a tangible and non-transitory machine-readable storage medium encoded with instructions for execution by a hardware management device for controlling consumption of a hardware module, the hardware module including a plurality of hardware components, the tangible and non-transitory machine-readable storage medium including one or more of the following: instructions for projecting a failure date for the hardware module; instructions for determining whether the projected failure date is acceptable based on a target replacement date for the hardware module; instructions for, if the projected failure date is not acceptable: determining at least one parameter adjustment for at least one hardware component of the plurality of hardware components, wherein the at least one parameter adjustment is selected to move the projected failure date closer to the target replacement date, and applying the at least one parameter adjustment to the at least one hardware component of the plurality of hardware components.

Various exemplary embodiments are described wherein the at least one parameter adjustment is selected to cause the hardware module to fail sooner than the projected failure date.

Various exemplary embodiments additionally include estimating a current life phase for the module based on a failure rate for each of the plurality of hardware components; wherein the step of projecting a failure date for the hardware module is performed based on the current life phase of the module.

Various exemplary embodiments are described wherein the hardware management device manages a plurality of hardware modules and each hardware module is associated with a current life phase, and further including one or more of the following: receiving a request for establishment of an agent device; determining a life phase permission associated with the request, wherein the life phase permission indicates that a module having a permitted life phase should be used for fulfilling the request; selecting a hardware module of the plurality of hardware modules, wherein the selected hardware module is associated with the permitted life phase; and fulfilling the request using the selected hardware module.

Various exemplary embodiments are described wherein the step of projecting a failure date for the hardware module includes projecting a date at which a failure condition will be met, wherein the failure condition is met when less than a configured number of hardware components remain operational.

Various exemplary embodiments additionally include determining a failure rate of at least one of the plurality of hardware components, wherein the step of projecting a failure date for the hardware module is performed based on the failure rate of at least one of the plurality of hardware components.

Various exemplary embodiments are described wherein the at least one parameter adjustment includes an adjustment to at least one of the following: a cooling rate, a voltage, a clock frequency, and an activation schedule.

BRIEF DESCRIPTION OF THE DRAWINGS

In order to better understand various exemplary embodiments, reference is made to the accompanying drawings, wherein:

FIG. 1b illustrates an alternative arrangement for some components of FIG. 1a;

FIG. 1c illustrates another alternative arrangement for some components of FIG. 1a;

FIG. 5 illustrates an exemplary data arrangement for storing hardware status information;

To facilitate understanding, identical reference numerals have been used to designate elements having substantially the same or similar structure and/or substantially the same or similar function.

DETAILED DESCRIPTION

Figure 1A:
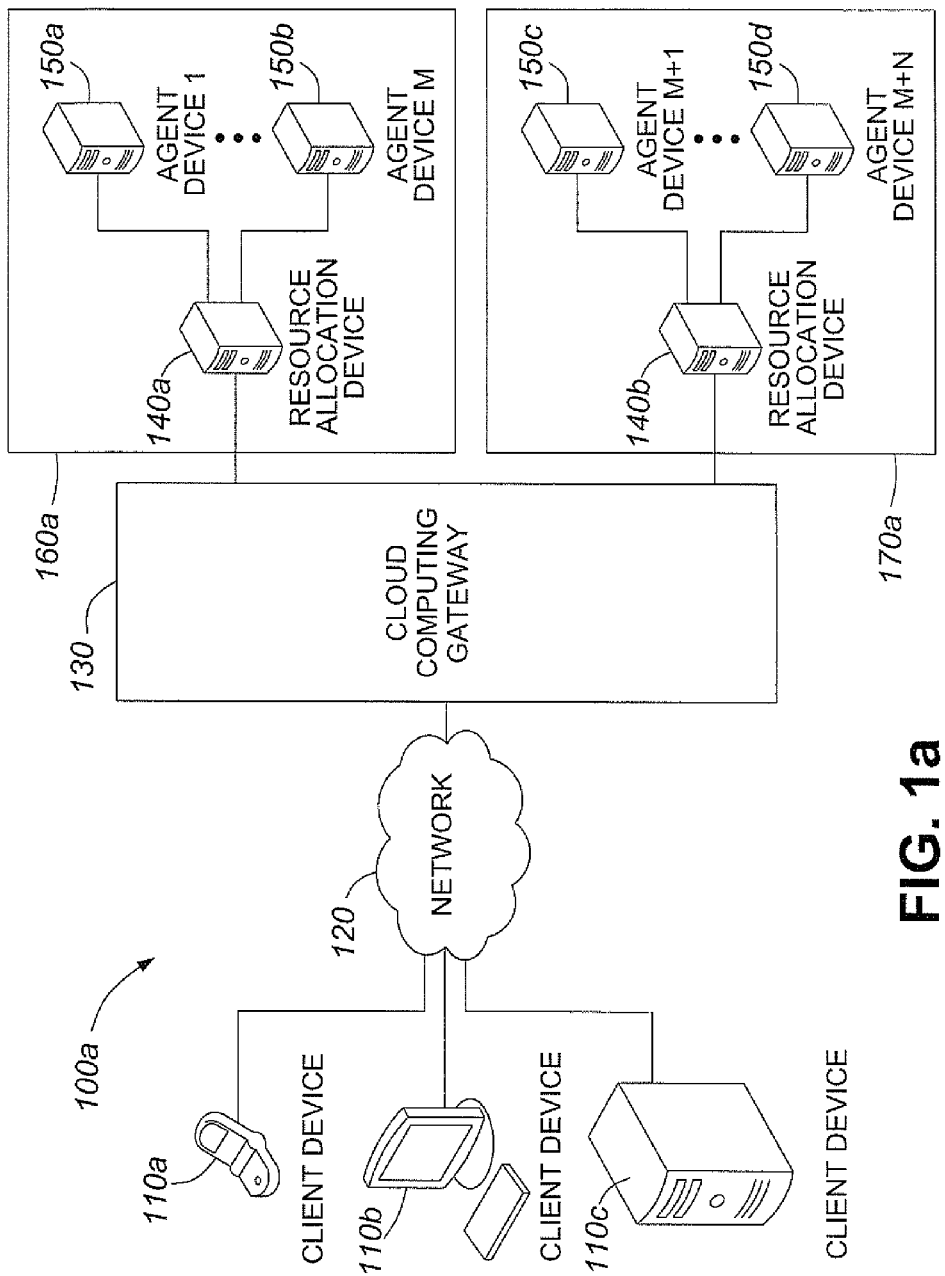
FIG. 1a illustrates an exemplary system for providing shared hardware resources.

In view of the foregoing, it would be desirable to provide a hardware architecture that limits the impact of a failed hardware resource on the total resources available. In particular, it would be desirable for such an architecture to deactivate any failed components while all other components remain fully operational. Referring now to the drawings, there are disclosed broad aspects of various exemplary embodiments.

FIG. 1a illustrates an exemplary system 100a for providing shared hardware resources. Such hardware resources may be shared, for example, to support some networked application serving client users. Exemplary system may include a number of client devices 110a-c, a network 120, cloud computing gateway 130, resource allocation devices 140a-b, and a number of agent devices 150a-d. Resource allocation devices 140a-b and agent devices 150a-d may reside among one or more cloud computing infrastructure.

Client devices 110 a-c may each include any device capable of communicating with a network such as network 120. While three devices are illustrated here, exemplary system 100a may include fewer or more devices. Further, the number of client devices participating in exemplary system 100a may change during operation. For example, client device 110a may cease participating in exemplary system 100a and/or another two client devices (not shown) may commence similar participation.

Each client device 110a-c may be a personal or laptop computer, terminal, server, tablet, wireless email device, cell phone, smart phone, television set-top box, or any other device capable of communicating with other devices via network 120. Each client device 110a-c may participate in exemplary system 100a for different reasons. For example, client device 110a may be a thin client and may rely on other resources within exemplary system 100a to perform most or all processing related to the normal operation of client device 110*a*. As another example, client device 110*b* may be a personal computer capable of independently performing most tasks and may rely on other resources within exemplary system 100*a* to store and retrieve data such as, for example, a large music or eBook collection. As yet another example, client device 110*c* may be a server that receives and responds to requests from other devices (not shown). Client device 110*c* may rely on other resources within exemplary system 100*a* to process a portion of such requests when the rate at which such requests arrive is too high for client device 110*c* to process within some measure of efficiency, response time, or other metric for gauging server load.

Network 120 may be a device or group of devices adapted to provide communication between other devices of exemplary system 100*a*. Accordingly, network 120 may include a number of routers and/or switches for forwarding packets to appropriate destinations. In various embodiments, network 120 may include one or more 2G, 3G, and/or 4G systems and/or other wireless systems. Further, in various embodiments, network 120 may include wired networks such as the Internet and/or one or more local area networks (LANs).

Cloud computing gateway 130 may be a device or group of devices adapted to manage hardware resources. As such, cloud computing gateway may effect the establishment of agent devices such as agent devices 150*a-d*, route messages between client devices 110*a-c* and agent devices 150*a-d*, charge users for hardware utilization, monitor the state of hardware resources, and/or control consumption of hardware resources. The detailed operation of cloud computing gateway will be described in greater detail below with respect to FIG. 2.

As will be described in greater detail below, the hardware resources managed by cloud computing gateway 130 may include a number of hardware modules. Each hardware module may be a circuit board that includes a number of hardware components. The hardware components, in turn, provide the hardware resources managed by the cloud computing gateway 130. For example, one hardware module may be a circuit board on which thirty-two processors are mounted. The cloud computing gateway 130 may operate to manage, at least in part, the usage and consumption of the processing capacity of those thirty-two processors. Further examples of hardware modules will be described with reference to FIG. 2. Exemplary system 100*a*, as illustrated, may include two hardware modules 160*a*, 170*a*. Note that while two hardware modules 160*a*, 170*a* are illustrated, exemplary system 100*a* may include fewer or more hardware modules (not shown).

Resource allocation devices 140*a-b* may each be a device that utilizes hardware resources of a hardware module such as hardware modules 160*a*, 170*a*. Resource allocation devices 140*a-b* may also manage agent devices 150*a-d*. For example, resource allocation device 140*a* may manage agent devices 150*a-b*, while resource allocation device 140*b* may manage agent devices 150*c-d*. In managing agent devices 150*a-d*, resource allocation devices 140*a-b* may assign and/or enforce shared hardware resources of hardware modules 160*a*, 170*a* with respect to each agent device 140*a-d*. For example, resource allocation device 140*a* may ensure that agent device 1 150*a* may use 20% of the processing time on a first CPU while agent device M 150*b* may use 10% of the processing time on the same CPU. Accordingly, in various embodiments, resource allocation devices 140*a-b* may each include a hypervisor. Resource allocation devices 140*a-b* may perform numerous additional functions such as, for example, request and response message routing, resource reservation, load balancing, usage metering, and/or charging. Note that while exemplary system 100*a* includes two resource allocation devices 140*a-b*, various embodiments may include fewer or more resource allocation devices (not shown).

Agent devices 150*a-d* may each be devices configured to operate in conjunction with one or more of client devices 110*a-c*. Each agent device 150*a-d* may include hardware resources such as one or more processors, memory, storage, and/or network interfaces. In various embodiments, agent devices 150*a-d* may share such hardware resources with other agent devices 150*a-d* and/or resource allocation devices 140*a-b*. For example, agent device 1 150*a* may share a CPU with resource allocation device 140*a* and agent device M 150*b*. Such hardware resources may be disposed among one or more physical hardware modules such as hardware modules 160*a*, 170*a*. In various embodiments, one or more of agent devices 150*a-d* may include a virtual machine.

Figure 1B:
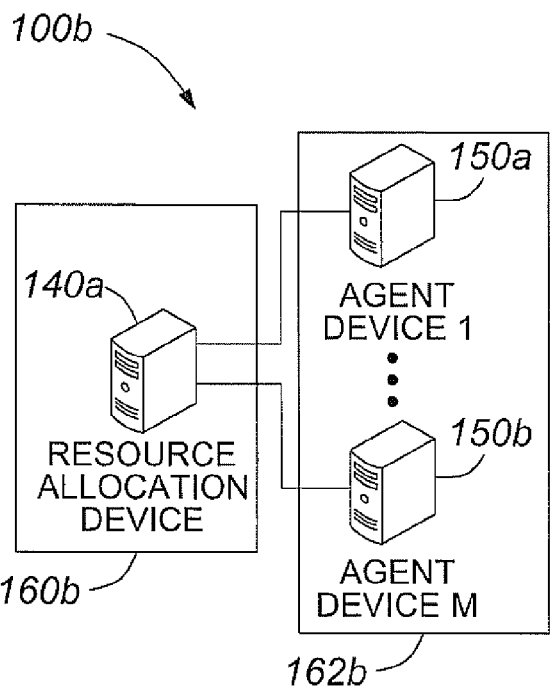
Figure 1C:
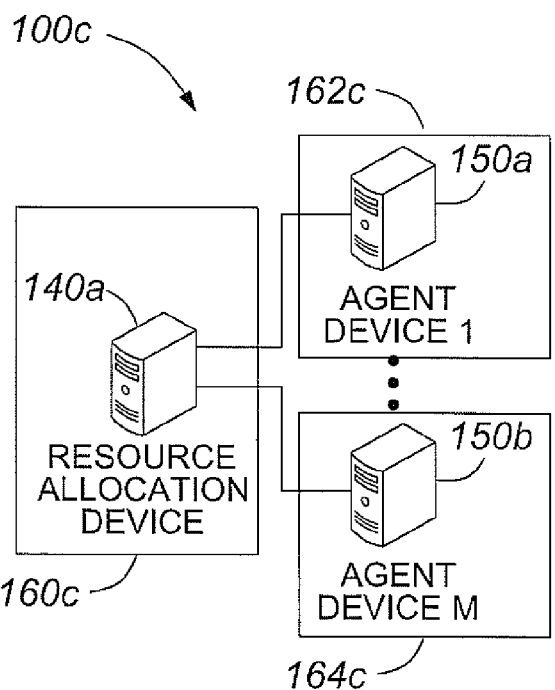

According to some embodiments, resource allocation devices 140*a-b* may reside together on the same physical hardware modules as the agent devices 150*a-d* that they manage. For example, resource allocation device 140*a* and agent devices 150*a-b* may reside together on a single physical hardware module 160*a*. In such embodiments, resource allocation device 140*a* may include a hypervisor while agent devices 150*a-b* may each include a virtual device, all of which may execute using various hardware components of the same hardware module. Likewise, resource allocation device 140*b* and agent devices 150*c-d* may reside together on another physical hardware module 170*a*. It should be apparent, however, that the methods described herein may be applied to various alternative configurations. For example, alternative configuration 100*b* as illustrated in FIG. 1*b*, shows that resource allocation device 140*a* may reside on a first hardware module 160*b* while agent devices 150*a-b* may all reside on a second hardware module 162*b*. As another alternative, alternative configuration 100*e* as illustrated in FIG. 1*c* shows that resource allocation device 140*a* and agent devices 150*a-b* may each reside on an independent hardware module 160*c*, 162*c*, 164*c*, respectively. Further, each resource allocation device 140*a* and agent devices 150*a-b* may utilize resources provided by multiple hardware modules. Various additional arrangements may be apparent to those of skill in the art.

Returning to FIG. 1*a*, cloud computing gateway 130 and/or resource allocation devices 140*a-b* may be configured to handle failures of the hardware components of a hardware module. For example, if a CPU of hardware module 160*a* fails or is otherwise deemed unusable, cloud computing gateway 130 and/or resource allocation device 140*a* may deactivate the failed CPU by modifying software or hardware configurations of the CPU or otherwise removing the CPU from the available resource pool. Cloud computing gateway 130 and/or resource allocation device 140*a* may subsequently reduce operational expenses as well by reconfiguring hardware module 160*a* to power down the failed CPU. Cloud computing gateway 130 and/or resource allocation device 140*a* may further reconfigure any agent devices 150*a-b* previously using the failed CPU to instead utilize a different CPU on module 160*a* or a CPU on another module such as module 170*a*. In this way, the hardware modules 160*a*, 170*a* may remain operational as their constituent components fail. The modules may continue to function, albeit at diminished capacity, as they incrementally fail. When the module capacity falls below a point where it is cost-effective to continue operation, the hardware module may be discarded and replaced. In this manner, the present architecture provides for the consumption of hardware resources.

Cloud computing gateway 130 and/or resource allocation devices 140*a-b* may further be adapted to manage the consumption of hardware modules 160a, 170a. In particular, cloud computing gateway 130 and/or resource allocation devices 140a-b may adjust various operating parameters of hardware modules 160a, 170a, or the components thereof, to ensure that the hardware module 160a, 170a reach the end of their useful lives at or slightly beyond a target replacement date. If, for example, hardware module 160a is predicted to become non-cost-effective sooner than its target replacement date, cloud computing gateway 130 and/or resource allocation device 140a may adjust the operating parameters to prolong the life of the hardware module such as, for example, lowering an operating voltage or clock rate to reduce component stress and thereby prolong its useful service life. Conversely, if hardware module 170a is predicted to remain cost effective for some time after its target replacement date, cloud computing gateway 130 and/or resource allocation device 140b may adjust the operating parameters to shorten the life of the hardware module, such as, for example boosting workload, thereby ensuring maximum usage of the hardware module by the time it is replaced, or lowering a cooling rate, thereby reducing operational expenses.

System administrators may use the above functionality to plan for periodic replacement of all hardware modules. For example, system administrators may configure each hardware module to have a useful life of three years, staggered such that each month 1/36 of the total hardware modules are to be replaced. In a system employing the methods described herein, the system administrator is assured that when a hardware module is replaced on the scheduled date, it has been fully utilized and is truly no longer cost effective to keep in operation.

Figure 2:
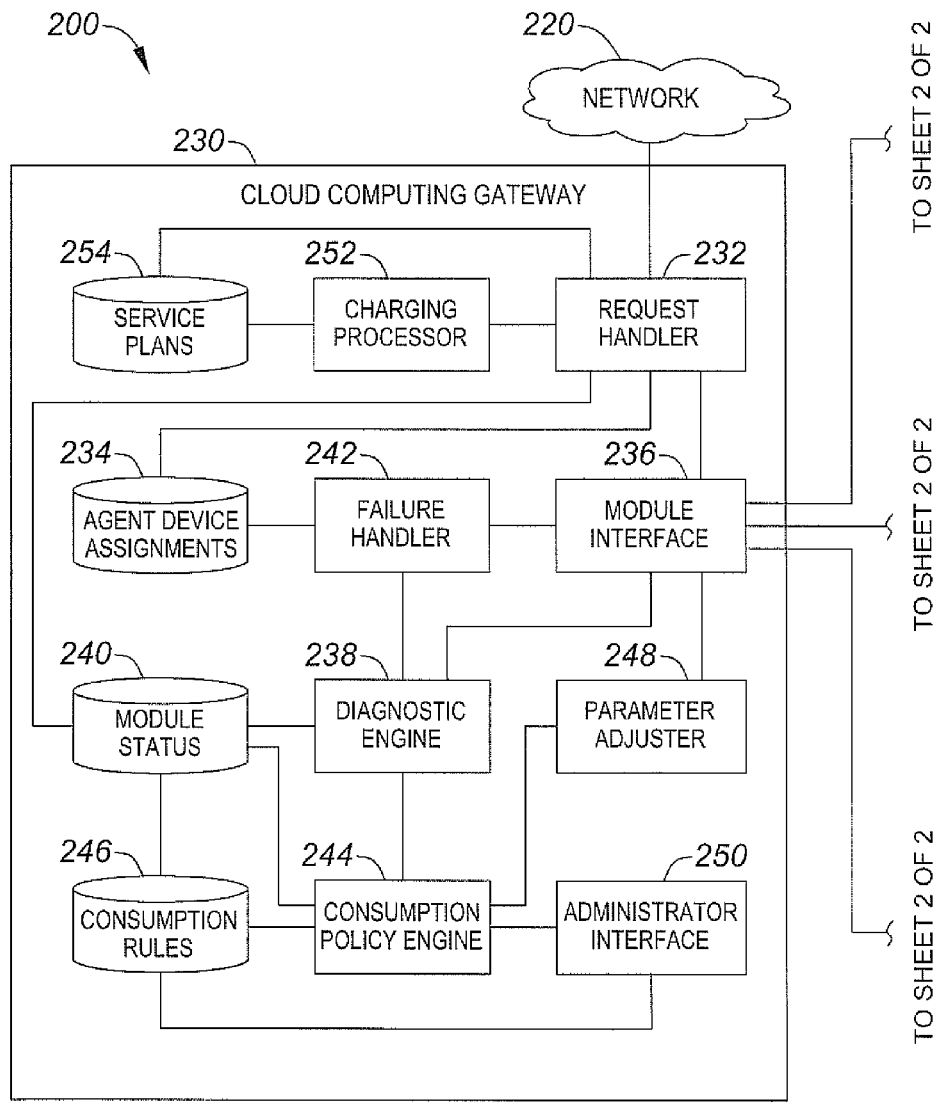
FIG. 2 illustrates an exemplary hardware system from providing consumable hardware resources.
Figure 2:
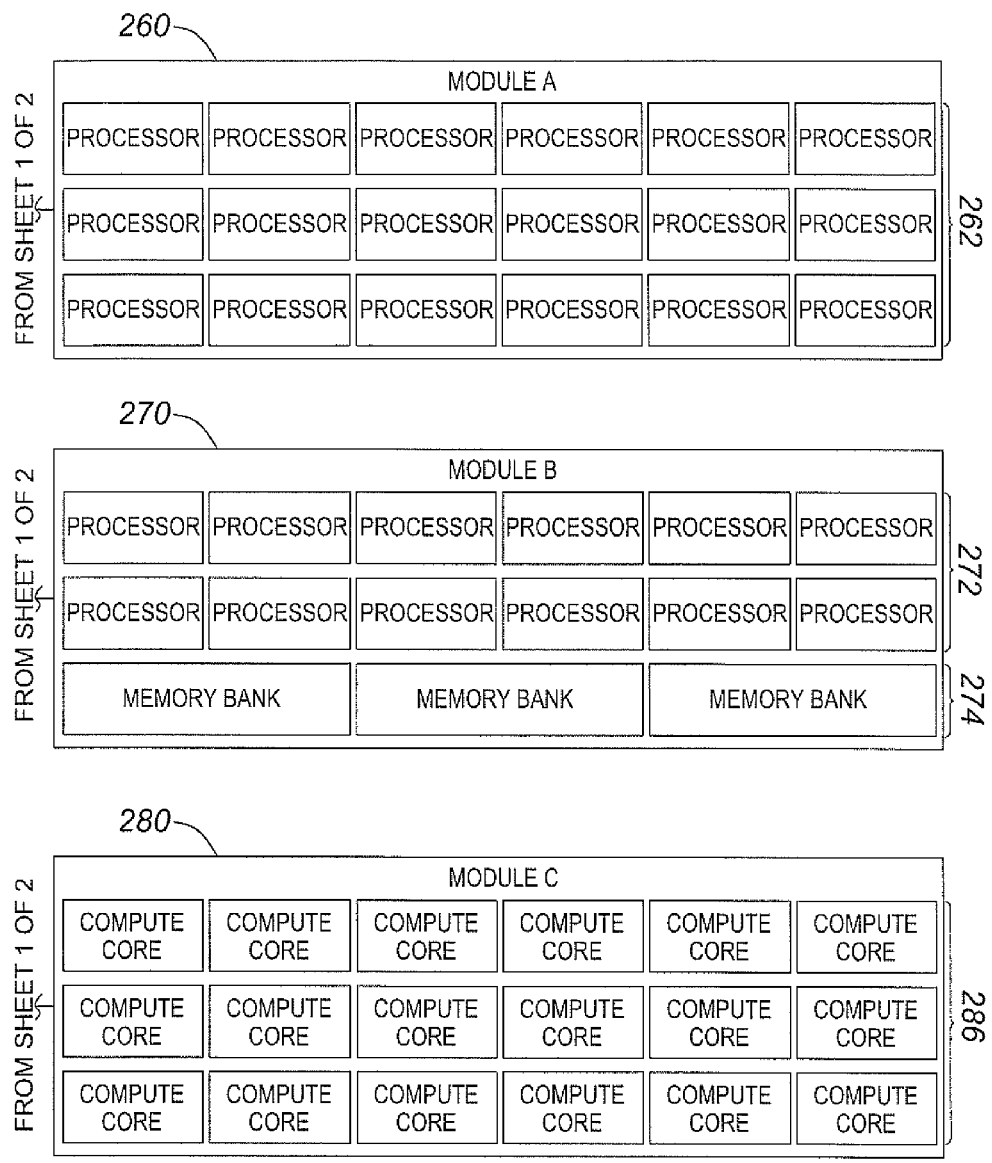

FIG. 2 illustrates an exemplary hardware system 200 from providing consumable hardware resources. Exemplary hardware system 200 may correspond to a portion of exemplary system 100a. Exemplary hardware system 200 may include network 220, cloud computing gateway 230, and hardware modules 260, 270, 280.

Network 220 may be a device or group of devices adapted to provide communication between other devices of exemplary system 100a. Accordingly, network 120 may include a number of routers and/or switches for forwarding packets to appropriate destinations. In various embodiments, network 120 may include one or more 2G, 3G, and/or 4G systems and/or other wireless systems. Further, in various embodiments, network 120 may include wired networks such as the Internet and/or one or more local area networks (LANs). In various embodiments, network 220 may correspond to network 120 of exemplary system 100a.

Cloud computing gateway 230 may be a device or group of devices adapted to manage hardware resources. Accordingly, cloud computing gateway 230 may correspond to cloud computing gateway 130 of exemplary system 100a. Cloud computing gateway 230 may include request handler 232, agent device assignments storage 234, module interface 236, diagnostic engine 238, module status storage 240, failure handler 242, consumption policy engine 244, consumption rules storage 246, parameter adjuster 248, administrator interface 250, charging processor 252, and service plans storage 254. It should be noted that various components of cloud computing gateway 230 may alternatively or additionally be located at one or more resource allocation devices (not shown) resident on one or more hardware modules 260, 270, 280.

Request handler 232 may include hardware and/or executable instructions on a machine-readable storage medium configured to receive and process requests for agent devices. For example, request handler 232 may receive a request from a client device (not shown) via network 220 requesting the establishment of a new agent device. Subsequently, request handler may determine an appropriate module 260, 270, 280 to host the new agent device and then communicate via module interface 236 with a resource allocation device (not shown) resident on the module 260, 270, 280 to effect establishment of the new agent device. The selection of the appropriate module 260, 270, 280 may be based, at least in part, on the current condition of the module 260, 270, 280 as stored in module status storage 240, a service plan of the requesting user as stored in service plans storage 254, and/or a reliability requirement for the application to be run on the new agent device. In establishing the new agent device, request handler 232 may also update the contents of agent device assignment storage to reflect the correspondence between the requesting client device, agent device, and hardware module(s) assigned to the agent device.

Request handler 232 may perform additional functionality such as routing messages between client devices (not shown) and active agent devices (not shown). To effect such functionality, request handler 232 may refer to data stored in agent device assignments storage 234 to determine which resource allocation device and/or hardware modules are associated with which client device. Request handler 232 may also forward data regarding establishment and usage of agent devices to charging processor such that a user of each client device (not shown) can be billed appropriately.

Agent device assignments storage 234 may be any machine-readable medium capable of storing information descriptive of agent devices. Accordingly, agent device assignments storage 234 may include a machine-readable storage medium such as read-only memory (ROM), random-access memory (RAM), magnetic disk storage media, optical storage media, flash-memory devices, and/or similar storage media. In various embodiments, agent device assignments storage 234 may store a correlation between each agent device and its associated resource allocation device and/or hardware module(s).

Module interface 236 may be an interface including hardware and/or executable instructions encoded on a machine-readable storage medium configured to enable communication with one or more hardware modules 260, 270, 280. In various embodiments, module interface 236 may include an Ethernet, PCI, SCSI, ATA, and/or other hardware interface technologies. In various embodiments, module interface 236 may include a blade server backplane.

Diagnostic engine 238 may include hardware and/or executable instructions on a machine-readable storage medium configured to effect performance of various diagnostics on hardware modules 260, 270, 280 and the hardware components 262, 272, 274, 286 thereof to gauge the current health and/or failure rate of those hardware devices. In various embodiments, diagnostic engine 238 may periodically initiate testing of each hardware component 262, 272, 274, 286 to determine a current and/or historical failure rate of the hardware component 262, 272, 274, 286. For example, diagnostic engine may communicate with a resource allocation device resident on the appropriate hardware module 260, 270, 280 to remove the component from the resource pool and/or establish a new agent device for performance of one or more diagnostic tests. Diagnostic engine 238 may then receive test results via module interface 236 and subsequently update module status storage 240 to reflect the current status of the tested hardware component. If a test indicates that a hardware component has failed or is otherwise unusable, diagnostic engine may then send an instruction to failure handler 242 to take appropriate adaptive action, as will be described in further detail below.

Diagnostic engine 238 may further utilize the diagnostic results of the individual hardware components 262, 272, 274, 286 as well as various "useful life" techniques, as are known in the art, to gauge a current life stage of the hardware module 260, 270, 280 as a whole. As will be described in greater detail below with respect to FIG. 4, hardware components can be expected to exhibit different rates of failure at different stages in their useful life. This phenomenon often follows the well-known "bathtub curve" model. Diagnostic engine 238 may be adapted to determine a current life stage for each module 260, 270, 280 for the purposes of tiered service plans and failure projections.

Module status storage 240 may be any machine-readable medium capable of storing status information related to hardware modules and hardware components. Accordingly, module status storage 240 may include a machine-readable storage medium such as read-only memory (ROM), random-access memory (RAM), magnetic disk storage media, optical storage media, flash-memory devices, and/or similar storage media. Exemplary contents of module status storage 240 will be described in greater detail below with respect to FIG. 5. In various embodiments, module status storage 240 may be the same device as agent device assignments storage 234.

Failure handler 242 may include hardware and/or executable instructions on a machine-readable storage medium configured to react to various hardware components 262, 272, 274, 286 failing or becoming otherwise unusable. Failure handler 242 may receive an indication of such a failure from diagnostic engine 238 and/or directly from a resource allocation device (not shown) operating on the corresponding hardware module 260, 270, 280. In response to an indication that a hardware component is newly unusable, failure handler 242 may refer to agent device assignments storage 234 to determine which agent devices may have utilized the hardware component. Failure handler 234 may also determine whether the associated hardware module's reduced capacity is sufficient to continue supporting all of the agent devices to which the module is currently assigned. Based on this information, failure handler 242 may redistribute one or more agent devices to other hardware modules. For example, if a processor 262 on module A becomes unusable, failure handler 242 may communicate with the resource allocation devices on modules 260, 270 to effect the movement of one or more agent devices to module B 270 to ensure that the performances of agent devices utilizing module A 260 do not suffer due to the module's now decreased capacity. Failure handler 242 may also update the contents of agent device assignments storage 234 to reflect the redistributed agent devices.

Consumption policy engine 244 may include hardware and/or executable instructions on a machine-readable storage medium configured to determine what action to take in response to the projected remaining life of a module. In various embodiments, using the status information stored in module status storage 240, consumption policy engine 244 may project an estimated failure date for each hardware module 260, 270, 280 using various techniques known in the art. In various embodiments, rather than projecting a date of total failure for each module, consumption rules storage may store a failure condition for one or more modules 260, 270, 280. This failure condition may specify a module status at which it is no longer cost effective to continue operating the module. For example, an administrator may determine that it is only cost effective to continue operating module A 260 while at least eight processors remain functional. Accordingly, consumption policy engine may project a date when module A 260 is expected to have less than eight functional processors.

Consumption policy engine 244 may then compare the projected failure date to a target replacement date for the module. Such target replacement date may be stored in consumption rules storage 246. If the projected failure date is not sufficiently close to the target replacement date, consumption policy engine 244 may indicate this fact to parameter adjuster such that the consumption rate of the module may be altered. In various embodiments, consumption policy engine 244 may require that the projected failure date coincide with the target replacement date, while other embodiments may allow for a tolerance of a number of days or months. Such other embodiments may allow this tolerance beyond, but not before, the target replacement date.

Consumption rules storage 246 may be any machine-readable medium capable of storing status information related to when each hardware module should and will be replaced. Accordingly, consumption rules storage 246 may include a machine-readable storage medium such as read-only memory (ROM), random-access memory (RAM), magnetic disk storage media, optical storage media, flash-memory devices, and/or similar storage media. In various embodiments, consumption rules storage 246 may store a failure condition and target replacement date for each module. In various embodiments, consumption rules storage 246 may be the same device as agent device assignments storage 234 and/or module status storage 240.

Parameter adjuster 248 may include hardware and/or executable instructions on a machine-readable storage medium configured to adjust various operating parameters of hardware components to shorten or prolong the useful life of hardware modules. Based on the target replacement date of a module and the projected failure date of the module, as reported by the consumption policy engine, the parameter adjuster may utilize one or more predictive models to determine one or more parameter adjustments operable to move the projected failure date of the module closer to the target replacement date. Such predictive models may be provided by, for example, hardware manufacturers of the hardware components 262, 272, 274, 286 and/or hardware modules 260, 270, 280. For example, if parameter adjuster 260 receives an indication that module A 260 is scheduled to be replaced in October, but has a projected life extending through November, parameter adjuster 248 may determine that the useful life of module A should be shortened by one month. Using manufacturer-provided predictive models, parameter adjuster 248 may determine that overclocking processors 262 by an additional 200 MHz would reduce the useful life of module A 260 by about a month. After determining an appropriate parameter adjustment, parameter adjuster 248 may further be adapted to communicate with the hardware module 260, 270, 280 via module interface 236 to effect the parameter adjustment on the hardware.

Administrator interface 250 may include various devices such as a display, keyboard, and/or mouse such that an administrator may interact with the cloud computing gateway 230. In various embodiments, when the diagnostic engine 238, consumption policy engine 244, or other component determines that a module 260, 270, 280 has failed and must be replaced, possibly before the target replacement date, administrator interface may alert the administrator to the failure. Further administrator interface 250 may enable the administrator to modify the contents of consumption rules storage 246. For example, the administrator may be able to use administrator interface 250 to define failure conditions and target replacement dates for various modules 260, 270, 280. For example, the administrator may modify the failure condition of module A from less than 6 operational processors to less than 8 operational processors in view of an updated business decision. Various additional uses for administrator interface 250 will be apparent to those of skill in the art.

Charging processor 252 may include hardware and/or executable instructions on a machine-readable storage medium configured to charge users of exemplary hardware system. Charging processor 252 may receive indications of activity from request handler 232 and subsequently charge an account of the associated user based on their service plan. Various metering and charging methods will be apparent to those of skill in the art.

Service plans storage 254 may be any machine-readable medium capable of storing information regarding service plans associated with various users of exemplary hardware system 200. Accordingly, service plans storage 254 may include a machine-readable storage medium such as read-only memory (ROM), random-access memory (RAM), magnetic disk storage media, optical storage media, flash-memory devices, and/or similar storage media. In various embodiments, service plans storage 254 may store user identification data, billing information, service tiers, and other information useful in defining the privileges and charging details for various users. In various embodiments, service plans storage 254 may be the same device as agent device assignments storage 234, module status storage 240, and/or consumption rules storage 246.

Hardware modules 260, 270, 280 may each be a hardware module that provides hardware resources for use in exemplary hardware system 200. Hardware modules 260, 270, 280 illustrate three different possible configurations of hardware modules. Those of skill in the art will understand that while three possibilities are illustrated, various alternative configurations may also exist. Further, while three hardware modules 260, 270, 280 are shown, hardware system 200 may include fewer or more hardware modules.

Hardware module A 260 may be a homogenous type hardware module. In other words, module A 260 may include hardware components of a single type. In the illustrated example, module A 260 includes eighteen processors 262 and no other hardware components. It should be noted that, as used herein, the term "hardware component" refers to those components providing hardware resources to be used as part of a resource allocation device or agent device, or otherwise to be offered for use by an external client device. Accordingly, while module A 260 may include additional hardware such as, for example, a power supply and/or a communication interface to support processors 262, such hardware does not constitute hardware components.

One or more of processors 262 may belong, at least in part, to a resource allocation device (not shown). As previously explained, resource allocation device may be responsible for managing a number of agent devices (not shown) that also include one or more of processors 262, at least in part. As noted above, module A 260 may be a homogenous module. As such, agent devices utilizing processors 262 may additionally utilize other hardware components located on other hardware modules (not shown). For example, an agent device utilizing one of processors 262 may also utilize a portion of main memory (not shown) mounted on a different module (not shown).

Module B 270 illustrates a decoupled heterogeneous hardware module. As shown, module B 270 includes twelve processors 272 and three memory banks 274. Like module A 260, module B 270 may support a resource allocation device and multiple agent devices. In the case of module B 270, however, each resource allocation device and agent device may draw multiple types of hardware resources from the same physical module. Any processor 272 may utilize any memory bank 274; in other words, the two resources are decoupled. In order to ensure efficient and effective usage, however, the resource allocation device may be responsible for assigning each agent device a specific share of one or more processors 272 and one or more memory banks 274.

Module C 280 illustrates a coupled heterogeneous hardware module. As shown, module C 280 includes eighteen "compute cores" 286. Each compute core 286 may include multiple hardware devices designed to work together as a unit. For example, each compute core 286 may include a processor and a memory bank (not shown). As such, each compute core may be referred to as a hardware element. Again, a resource allocation device and a number of agent devices may share the compute cores 286. Because the various types of hardware resources are tightly coupled however, the resource allocation device may not necessarily manage the assignment of as many different types of resources to agent devices; instead, the resource allocation device may simply allocate each agent device a share of one or more computer cores 286.

As will be described in further detail with respect to FIG. 3, each module 260, 270, 280 may be designed such that any single hardware component may be deactivated while the remaining hardware components continue operation. As such, each module 260, 270, 280 may include power delivery circuitry that may be interrupted by a control signal for each mounted hardware component. Such control signal may be asserted by the resource allocation device, cloud computing gateway, and/or a separate device (not shown) adapted to manage the health of the hardware modules upon determining that a particular hardware component has failed or is otherwise no longer usable.

Figure 3:
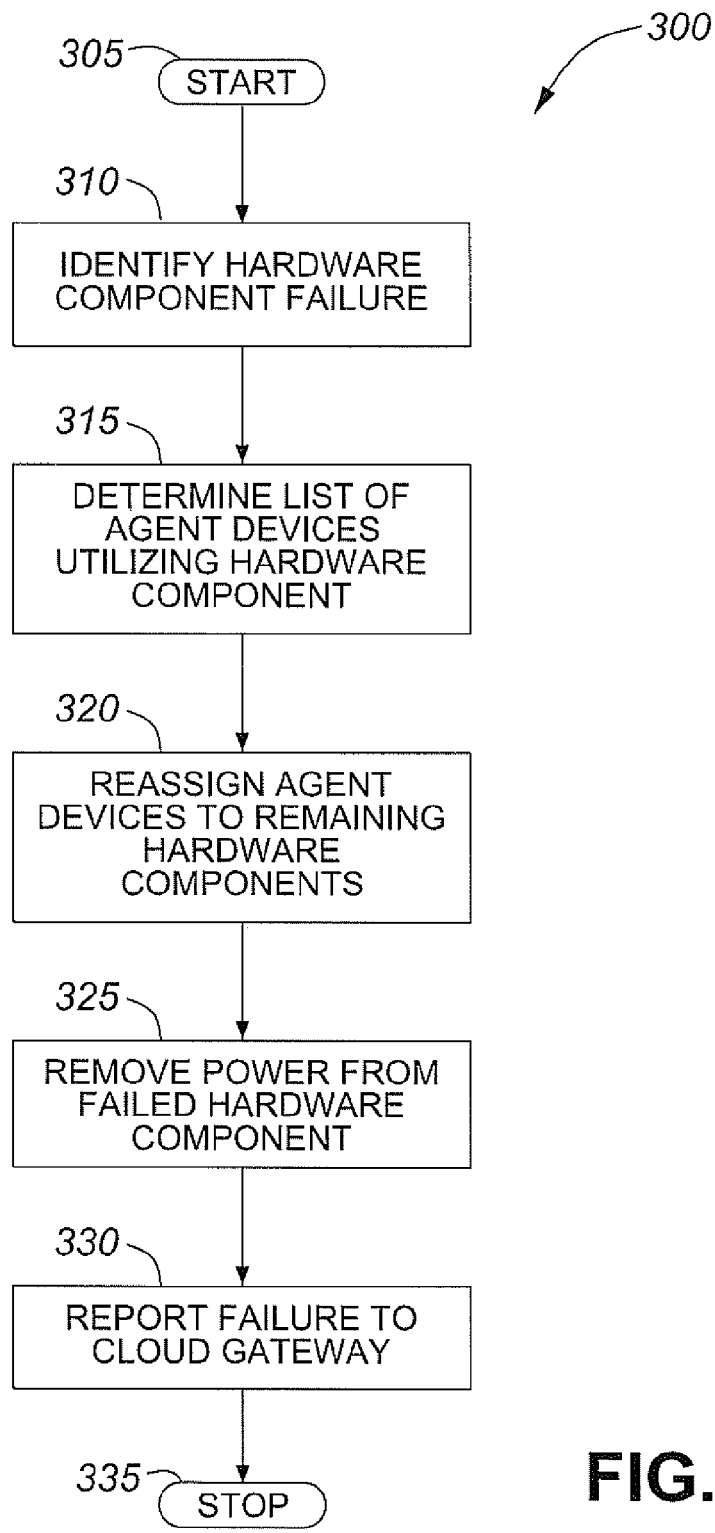
FIG. 3 illustrates an exemplary method for handling a failed hardware component.

FIG. 3 illustrates an exemplary method 300 for handling a failed hardware component. For the purposes of explanation, method 300 will be assumed to be performed by a resource allocation device. It will be understood, however, that exemplary method 300 may additionally or alternatively be performed by the components of a cloud computing gateway such as cloud computing gateway 200.

Exemplary method 300 may begin in step 305 and proceed to step 310 where the resource allocation device identifies a hardware component failure. In particular, the resource allocation device may determine that a hardware component has failed or will likely fail in the near future. In various embodiments, the resource allocation device may otherwise deem the hardware component unusable. Method 300 may then proceed to step 315 where the resource allocation device determines which agent devices currently include a share of the unusable hardware component. Then, in step 320, the resource allocation device may reassign those agent devices to use other hardware components instead. After performance of this step, the failed component may no longer be used to provide hardware resources to any devices. At this point, the method 300 may optionally end and the resource allocation device may simply avoid using the failed component in the future.

In various embodiments, method 300 may proceed to step 325 where the resource allocation device may reconfigure the hardware module to power down the failed hardware component. This may have the effect of decreasing power consumption and, consequently, the cost of continued operation of the module as a whole. Then, in step 330, the resource allocation device may report the failure to the cloud computing gateway. Using this report, the cloud computing gateway may proceed to redistribute agent devices at a higher level, among multiple resource allocation devices. It should be apparent that in embodiments where method 300 is performed by the cloud computing gateway itself, step 330 may not be present. Method 300 may then proceed to end in step 335.

Figure 4:
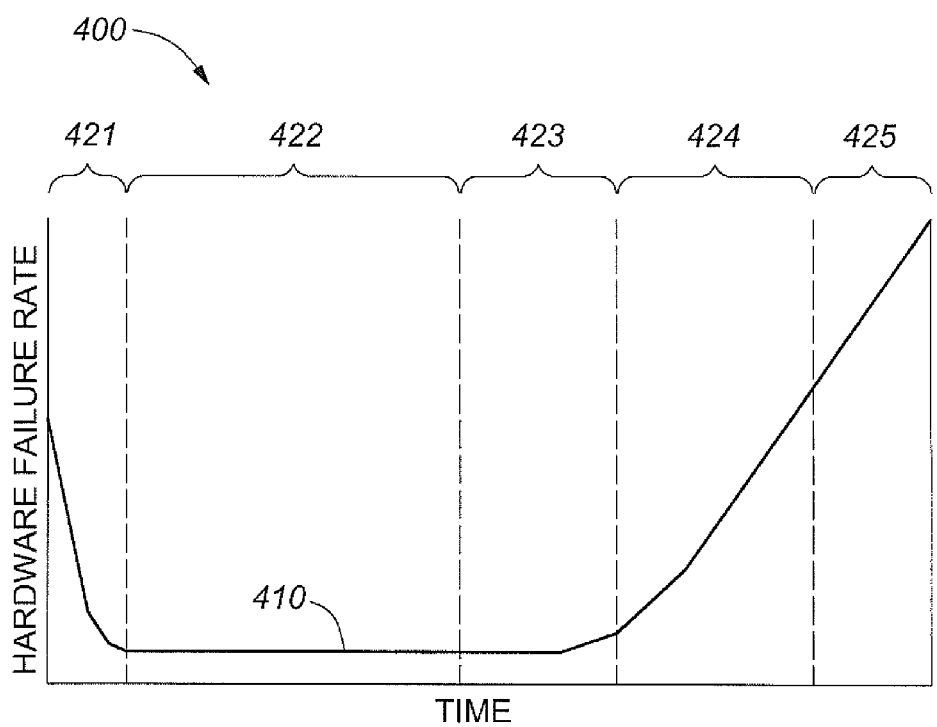
FIG. 4 illustrates an exemplary graph of the failure rate of a hardware module over time.

FIG. 4 illustrates an exemplary graph 400 of the failure rate of a hardware module over time. Line 410 shows that the hardware failure rate of a piece of hardware may generally follow the "bathtub curve" model over time. Near the beginning of the life of a hardware device, hardware failure may be relatively high due to the so-called "infant mortality rate." In other words, some hardware devices fail shortly after being put into operation due to latent defects. After surviving this phase, the hardware enjoys the majority of its useful life error free. Then, as the hardware ages, hardware failures increase in frequency due to "wear out" until, eventually, the hardware is completely unusable.

According to various aspects of the systems described herein, the useful life of a hardware component may be classified into various stages for hardware assignment and charging purposes. As shown, graph 400 is divided into five life phases. The brand new phase 421, prime phase 422, aging phase 423, wear out phase 424, and end of life phase 425. It should be apparent that various alternative phase arrangements may be possible.

As part of assessing the current state of a hardware module, the cloud computing gateway and/or the resource allocation device may be adapted to determine the life phase in which the hardware module currently operates. This information can be determined using various useful life techniques known in the art as well as the historical failure rates of the module's constituent components. Subsequently, this information can be used to assign new agent devices to hardware modules based on the module's life phase. For example, a premium user may pay more for use of hardware currently operating in the prime phase 422, where hardware failures are unlikely. As another example, different applications may have different failure tolerances. As such, a highly risk tolerant application may be assigned hardware operating in the brand new phase 421 or the wear out phase 424. Further, the cloud computing gateway and/or the resource allocation device may entirely avoid modules that are in the end of life phase 425.

FIG. 5 illustrates an exemplary data arrangement 500 for storing hardware status information. Exemplary data arrangement 500 may illustrate exemplary contents of module status storage 240 of exemplary hardware system 230. Data arrangement may include a number of fields such as, for example, module field 510, life phase field 520, component field 530, and failure rate field 540.

Module field 510 may identify the module to which a particular module record applies. Life phase field 520 may indicate a most recently estimated life phase for the module. Component field 530 may identify a hardware component mounted on the module. Failure rate field 540 may indicate a most recently observed failure rate for the component. It will be noted that, while data arrangement 500 illustrates component records nested within module records, this may constitute an abstraction. Those of skill in the art will recognize that data arrangement 500 may actually be stored in a number of different manners. For example, data arrangement 500 may actually be stored as multiple tables, independently dedicated to hardware modules and hardware components, respectively.

As an example, module record 560 may indicate that module A is currently estimated to be in the third life phase, or aging phase 423. Module record 560 may include a number of component sub-records 562, 564, 566. Component sub-record 562 may indicate that CPU1 has been observed to carry a 5% failure rate while component sub-record 564 may indicate that CPU2 has been observed to carry a 50% failure rate. Module record 560 may include numerous additional component sub-records 566. Exemplary module records 570, 580 and exemplary component sub-records 572, 573, 574, 576, 578, 582, 584, 586 indicate similar information, the meanings of which will be apparent in view of the foregoing description.

Figure 6:
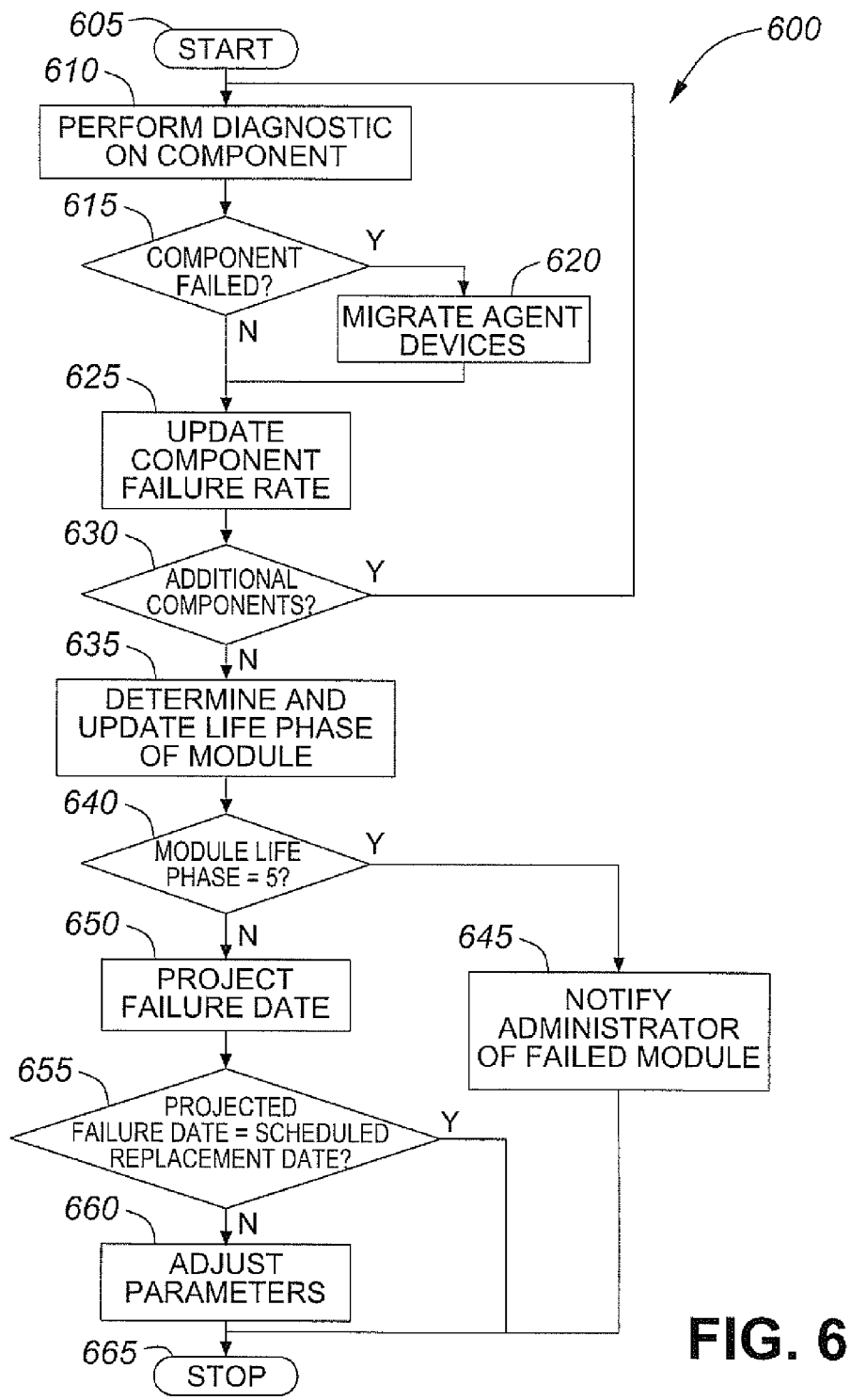
FIG. 6 illustrates an exemplary method for controlling the consumption of hardware resources.

FIG. 6 illustrates an exemplary method 600 for controlling the consumption of hardware resources. For the purposes of explanation, method 600 will be assumed to be performed by the components of a cloud computing gateway such as cloud computing gateway 200. It will be understood, however, that exemplary method 300 may additionally or alternatively be performed by a resource allocation device.

Method 600 may begin in step 605 and proceed to step 610 where the cloud computing gateway may effect the performance of a diagnostic test on a hardware component. For example, the cloud computing gateway may remove the component from the resource pool and/or initiate a new agent device on the component to perform one or more tests. Upon receiving results from the diagnostic test, the cloud computing gateway may determine, in step 615 whether the tests indicate that the component is no longer usable. In various embodiments, cloud computing gateway may determine that the component is "no longer usable" and has thus "failed" when continued operation of the component is no longer cost effective and/or capable of delivering service of acceptable quality with a low enough risk of failure. Thus, while a component may remain technically operational, the cloud computing gateway may deem it a failed component based on various additional factors.

If the component has failed, then the cloud computing gateway may migrate one or more agent devices to different hardware modules in step 620 to reduce the load on the module with the failed component. If the component has not yet failed or after the cloud computing gateway has migrated agent devices, method 600 may proceed to step 625 where the cloud computing gateway may update failure rate information associated with the tested component.

In step 630, the cloud computing gateway may determine whether it should test additional components. For example, the cloud computing gateway may test all components on a module at the same time or may have a number of components scheduled for testing at a particular time. If additional components remain to be tested, method 600 may loop back to step 610. Once all components to be tested have been tested, method 600 may proceed from step 630 to step 635.

In step 635, the cloud computing gateway may estimate the current life phase for a hardware module. This step may be performed according to various "useful life" techniques known to those of skill in the art and may be based on the failure rates of the hardware module's constituent components. For the purposes of explanation, it will be assumed that method 600 defines life phases in the manner detailed with respect to FIG. 4. It will be apparent that various alternative life phase schemes may also be employed. After estimating the life phase of the module, the cloud computing gateway may update a module record and method 600.

Next, in step 640, the cloud computing gateway may determine whether the module is estimated to currently operate in life phase 5. In other words, the cloud computing gateway may determine whether the module is in the "end of life" phase. If so, the cloud computing gateway may notify an administrator that the module is no longer usable and should be replaced in step 645. If however, the module is in a different life phase, method 800 may proceed to step 650. It should be noted that in various alternative embodiments, the cloud computing gateway may be adapted to notify an administrator that a module should be replaced at a different life phase such as, for example, in the "wearout phase." Further, in various embodiments, the life phase that elicits the replacement notification of step 645 may be configurable by and administrator based on a system wide or per-module basis. Various additional modifications to step 640 will be apparent to those of skill in the art.

In step 650, the cloud computing gateway may project a failure date for the module. This step may be performed based on various methods known to those of skill in the art. For example, the cloud computing gateway may utilize a predictive model provided by a hardware manufacturer to estimate when the hardware module will meet a specified failure condition. This determination may be made based on various status information such as, for example, the life phase of the module and/or the failure rates of its constituent components.

The cloud computing gateway may proceed in step 655 to determine whether the projected failure date is sufficiently close to the target replacement date. In various embodiments, method 600 may require the two dates to coincide, while in other embodiments, method 600 may allow for a predetermined variance in the two dates. If the two dates are sufficiently close, the module is deemed to be on track to be consumed by the replacement date and the method 600 may proceed to end in step 655.

If, however, the two dates are not sufficiently close, the cloud computing gateway may adjust various operating parameters of the hardware in step 660. By adjusting the parameters, the cloud computing gateway may hasten or delay the failure of the hardware module such that the hardware module can now be expected to fail sufficiently close to the target replacement date. An exemplary process for achieving this functionality will be described in greater detail below with respect to FIG. 7. After reconfiguring the hardware module, method 600 may proceed to end in step 665.

Figure 7:
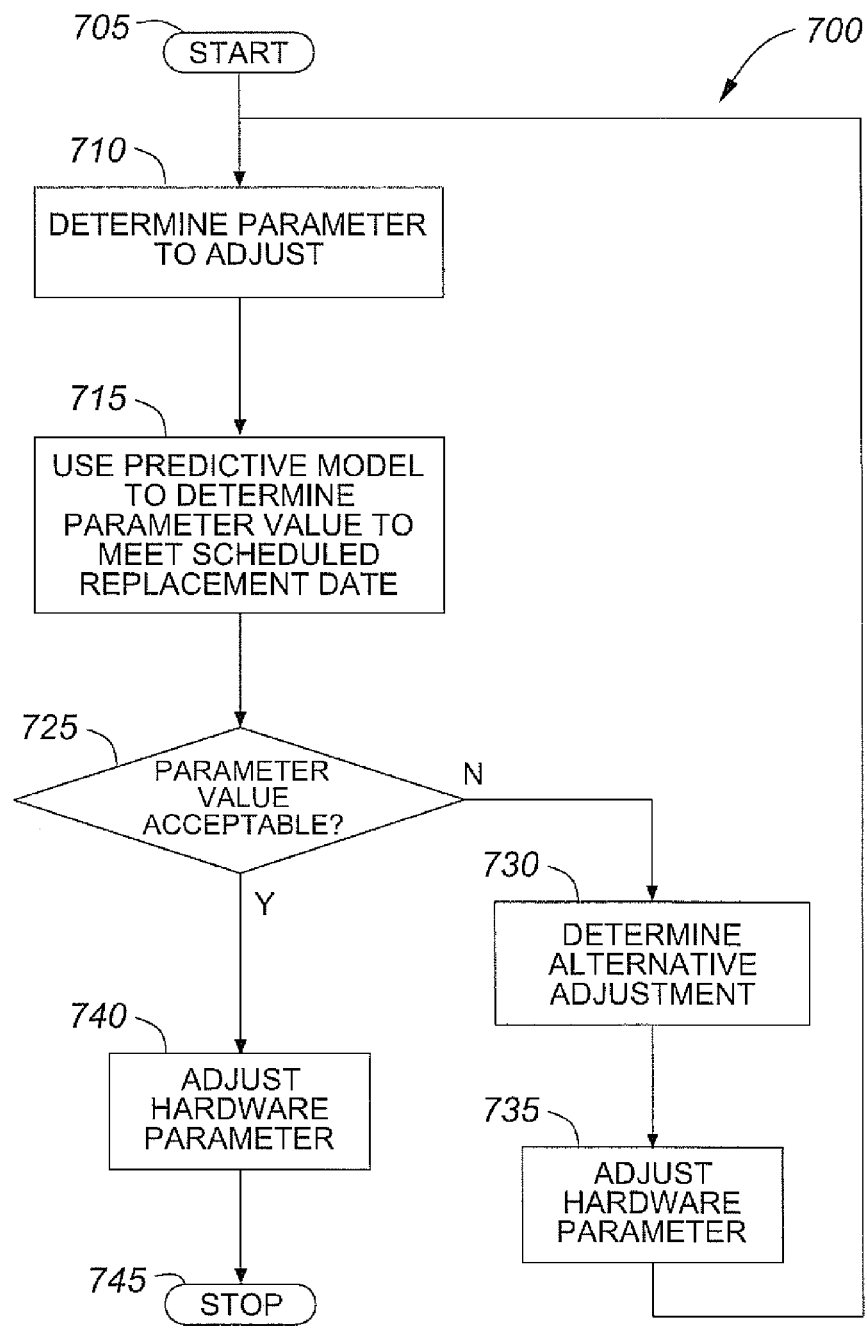
FIG. 7 illustrates an exemplary method for adjusting hardware parameters.

FIG. 7 illustrates an exemplary method 700 for adjusting hardware parameters. For the purposes of explanation, method 700 will be assumed to be performed by the components of a cloud computing gateway such as cloud computing gateway 200. It will be understood, however, that exemplary method 700 may additionally or alternatively be performed by a resource allocation device. Method 700 may correspond to step 660 of method 600.

Method 700 may begin in step 705 and proceed to step 710, where the cloud computing gateway may determine a parameter to adjust. For example, the cloud computing gateway may determine that it should adjust a clock frequency, cooling rate, and/or applied voltage. Alternatively or additionally, the cloud computing gateway may adjust an activation schedule, such that the component is active for a shorter or longer proportion of the time that the hardware module is operational. This determination may be made based on a predetermined parameter priority, a rule engine that applies a rule set for determining an appropriate parameter based on contextual data, or another method known to those of skill in the art.

Next, in step 715, the cloud computing gateway may determine how the selected parameter should be adjusted. For example, the cloud computing gateway may utilize a predictive model associated with the selected parameter to determine what modification to the parameter will cause the module to meet the target replacement date. For example, the predictive model may indicate that overclocking the CPUs on the module by 200 MHz, reducing cooling by 10%, or increasing the proportion of time that each CPU is active by 10% will cause the module to fail closer to the target replacement date. Then, in step 725, the cloud computing gateway may determine whether the parameter value is acceptable. The parameter value may be unacceptable, for example, if it is infeasible or impractical. For example, a module may not be able to safely increase the voltage past a certain level. As another example, overclocking a CPU may be impractical if the current load on the CPUs is already low. If the parameter value is unacceptable, the method may proceed to step 730.

In step 730, the cloud computing gateway may determine an alternative adjustment. For example, the cloud computing gateway may choose a parameter value somewhere between the current value and the value determined in step 715. Alternatively, the cloud computing gateway may determine that the parameter should not be adjusted at all. Next, in step 735, if the parameter is to be adjusted to an alternative value, the cloud computing gateway may effect such parameter adjustment. However, because an alternative adjustment was used, the module may not yet be configured to meet the target replacement date. Accordingly, method 700 may loop back to step 710 and repeat the process with a different parameter. As such, the cloud computing gateway may adjust multiple parameters to ensure that the module is consumed near the target replacement date.

Once the cloud computing gateway identifies an acceptable parameter adjustment that will be sufficient to cause the module to meet the target replacement date in step 725, method 700 may proceed to step 740. In step 740, the cloud computing gateway may effect the parameter adjustment and method 700 may proceed to end in step 745.

According to the foregoing, various embodiments enable a hardware architecture that limits the impact of a failed hardware resource on the total resources available. In particular, by providing hardware modules that can selectively deactivate or disuse failed hardware components, the hardware modules as a unit may continue operation. Further, by monitoring the status of such hardware modules and adjusting operation parameters of hardware components thereof, a hardware system can ensure that the hardware modules are fully consumed near a target replacement date.

It should be apparent from the foregoing description that various exemplary embodiments of the invention may be implemented in hardware, software, and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a hardware management device for enabling incremental failure of a hardware system, the hardware system including a hardware module, the hardware module including a circuit board upon which a plurality of hardware components is mounted, the method comprising:
   identifying a hardware failure of a failed component of the plurality of hardware components;
   determining a set of agent devices currently configured to utilize the failed component;
   for at least one agent device of the set of agent devices, reconfiguring the agent device to utilize a working component of the plurality of hardware components in place of the failed component; and
   deactivating the failed component, wherein other hardware components of the plurality of hardware components remain in operation.

2. The method of claim 1, further comprising reconfiguring the hardware module to power down the failed component while continuing to provide power to at least one other component of the plurality of hardware components.

3. The method of claim 1, wherein all hardware components mounted on the circuit board are of a single type of hardware component.

4. The method of claim 1, wherein the hardware management device comprises a hypervisor and wherein the hardware management device utilizes at least one component of the plurality of hardware components to operate.

5. The method of claim 1, wherein the hardware management device comprises a cloud computing gateway device and wherein:
   the hardware management device manages a plurality of hypervisors; and
   a first hypervisor of the plurality of hypervisors manages the plurality of hardware components.

6. The method of claim 5, further comprising:
   for at least one agent device of the set of agent devices, reconfiguring the agent device to be managed by a second hypervisor of the plurality of hypervisors.

7. A hardware system capable of incremental hardware failure, the hardware system comprising:
   a circuit board;
   a plurality of hardware components mounted on the circuit board;
   at least one agent device configured to utilize at least one hardware component of the plurality of hardware components; and
   a management device that, during run time, deactivates at least one hardware component of the plurality of hardware components while at least one remaining component of the plurality of hardware components remains in operation,
   wherein the management device deactivates the at least one hardware component of the plurality of hardware components in response to determining that the at least one hardware component has failed.

8. The hardware system of claim 7, wherein, in deactivating the at least one hardware component, the management device reconfigures the circuit board to power down the at least one component.

9. The hardware system of claim 7, wherein the management device includes a hypervisor and the management device utilizes at least one hardware component of the plurality of hardware components.

10. The hardware system of claim 7, wherein all hardware components mounted on the circuit board are of the same type.

11. The hardware system of claim 7, wherein, in deactivating the at least one hardware component, the management device:
   identifies a set of agent devices configured to utilize the at least one hardware component; and
   reconfigures at least one agent device of the set of agent devices to utilize the at least one remaining component instead of the at least one hardware component.

12. A tangible and non-transitory machine-readable storage medium encoded with instructions for execution by a hardware management device for enabling incremental failure of a hardware system, the hardware system including a hardware module, the hardware module including a circuit board upon which a plurality of hardware components is mounted, the tangible and non-transitory machine-readable storage medium comprising:
   instructions for identifying a hardware failure of a failed component of the plurality of hardware components;
   instructions for determining a set of agent devices currently configured to utilize the failed component;
   instructions for, for at least one agent device of the set of agent devices, reconfiguring the agent device to utilize a working component of the plurality of hardware components in place of the failed component; and
   instructions for deactivating the failed component, wherein other hardware components of the plurality of hardware components remain in operation.

13. The tangible and non-transitory machine-readable storage medium of claim 12, instructions for reconfiguring the hardware module to power down the failed component while continuing to provide power to at least one other component of the plurality of hardware components.

14. The tangible and non-transitory machine-readable storage medium of claim 12, wherein all hardware components mounted on the circuit board are of a single type of hardware component.

15. The tangible and non-transitory machine-readable storage medium of claim 12, wherein the hardware management device comprises a hypervisor and wherein the hardware management device utilizes at least one component of the plurality of hardware components to operate.

16. The tangible and non-transitory machine-readable storage medium of claim 12, wherein the hardware management device comprises a cloud computing gateway device and wherein:
   the hardware management device manages a plurality of hypervisors; and
   a first hypervisor of the plurality of hypervisors manages the plurality of hardware components.

17. The tangible and non-transitory machine-readable storage medium of claim 16, further comprising:
   instructions for, for at least one agent device of the set of agent devices, reconfiguring the agent device to be managed by a second hypervisor of the plurality of hypervisors.

18. A method performed by a hardware management device for controlling consumption of a hardware module, the hardware module including a plurality of hardware components, the method comprising:
   projecting a failure date for the hardware module;

determining whether the projected failure date is acceptable based on a target replacement date for the hardware module;
if the projected failure date is not acceptable:
determining at least one parameter adjustment for at least one hardware component of the plurality of hardware components, wherein the at least one parameter adjustment is selected to move the projected failure date closer to the target replacement date, and
applying the at least one parameter adjustment to the least one hardware component of the plurality of hardware components.

19. The method of claim 18, wherein the at least one parameter adjustment is selected to cause the hardware module to fail sooner than the projected failure date.

20. The method of claim 18, further comprising:
estimating a current life phase for the module based on a failure rate for each of the plurality of hardware components;
wherein the step of projecting a failure date for the hardware module is performed based on the current life phase of the module.

21. The method of claim 20, wherein the hardware management device manages a plurality of hardware modules and each hardware module is associated with a current life phase, the method further comprising:
receiving a request for establishment of an agent device;
determining a life phase permission associated with the request, wherein the life phase permission indicates that a module having a permitted life phase should be used for fulfilling the request;
selecting a hardware module of the plurality of hardware modules, wherein the selected hardware module is associated with the permitted life phase; and
fulfilling the request using the selected hardware module.

22. The method of claim 18, wherein the step of projecting a failure date for the hardware module comprises projecting a date at which a failure condition will be met, wherein the failure condition is met when less than a configured number of hardware components remain operational.

23. The method of claim 18, further comprising determining a failure rate of at least one of the plurality of hardware components, wherein the step of projecting a failure date for the hardware module is performed based on the failure rate of at least one of the plurality of hardware components.

24. The method of claim 18, wherein the at least one parameter adjustment comprises an adjustment to at least one of the following: a cooling rate, a voltage, a clock frequency, and an activation schedule.

25. A hardware management device for controlling consumption of a hardware module, the hardware module including a plurality of hardware components, the hardware management device comprising:
a consumption policy engine configured to:
project a failure date for the hardware module, and
determine whether the projected failure date is acceptable based on a target replacement date for the hardware module; and
a parameter adjuster that is configured to, if the projected failure date is not acceptable:
determine at least one parameter adjustment for at least one hardware component of the plurality of hardware components, wherein the at least one parameter adjustment is selected to move the projected failure date closer to the target replacement date, and
apply the at least one parameter adjustment to the at least one hardware component of the plurality of hardware components.

26. The hardware management device of claim 25, wherein parameter adjuster selects a parameter adjustment to cause the hardware module to fail sooner than the projected failure date.

27. The hardware management device of claim 25, further comprising a diagnostic engine that estimates a current life phase for the module based on a failure rate for each of the plurality of hardware components, wherein, the consumption policy engine projects the failure date for the hardware module based on the current life phase of the module.

28. The hardware management device of claim 27, wherein the hardware management device manages a plurality of hardware modules and each hardware module is associated with a current life phase, the hardware management device further comprising:
a request handler configured to:
receive a request for establishment of an agent device;
determine a life phase permission associated with the request, wherein the life phase permission indicates that a module having a permitted life phase should be used for fulfilling the request;
select a hardware module of the plurality of hardware modules, wherein the selected hardware module is associated with the permitted life phase; and
fulfill the request using the selected hardware module.

29. The hardware management device of claim 25, wherein the consumption policy engine projects the failure date for the hardware module by projecting a date at which a failure condition will be met, wherein the failure condition is met when less than a configured number of hardware components remain operational.

30. The hardware management device of claim 25, wherein the at least one parameter adjustment comprises an adjustment to at least one of the following: a cooling rate, a voltage, a clock frequency, and an activation schedule.

31. A tangible and non-transitory machine-readable storage medium encoded with instructions for execution by a hardware management device for controlling consumption of a hardware module, the hardware module including a plurality of hardware components, the tangible and non-transitory machine-readable storage medium comprising:
instructions for projecting a failure date for the hardware module;
instructions for determining whether the projected failure date is acceptable based on a target replacement date for the hardware module;
instructions for, if the projected failure date is not acceptable:
determining at least one parameter adjustment for at least one hardware component of the plurality of hardware components, wherein the at least one parameter adjustment is selected to move the projected failure date closer to the target replacement date, and
applying the at least one parameter adjustment to the at least one hardware component of the plurality of hardware components.

32. The tangible and non-transitory machine-readable storage medium of claim 31, wherein the at least one parameter adjustment is selected to cause the hardware module to fail sooner than the projected failure date.

33. The tangible and non-transitory machine-readable storage medium of claim 31, further comprising:

instructions for estimating a current life phase for the module based on a failure rate for each of the plurality of hardware components;

wherein the instructions for projecting a failure date for the hardware module operate based on the current life phase of the module.

34. The tangible and non-transitory machine-readable storage medium of claim 33, wherein the hardware management device manages a plurality of hardware modules and each hardware module is associated with a current life phase, the tangible and non-transitory machine-readable storage medium further comprising:

instructions for receiving a request for establishment of an agent device;

instructions for determining a life phase permission associated with the request, wherein the life phase permission indicates that a module having a permitted life phase should be used for fulfilling the request;

instructions for selecting a hardware module of the plurality of hardware modules, wherein the selected hardware module is associated with the permitted life phase; and instructions for fulfilling the request using the selected hardware module.

35. The tangible and non-transitory machine-readable storage medium of claim 31, wherein the instructions for projecting a failure date for the hardware module comprise instructions for projecting a date at which a failure condition will be met, wherein the failure condition is met when less than a configured number of hardware components remain operational.

36. The tangible and non-transitory machine-readable storage medium of claim 31, further comprising instructions for determining a failure rate of at least one of the plurality of hardware components, wherein the instructions for projecting a failure date for the hardware module operate based on the failure rate of at least one of the plurality of hardware components.

37. The tangible and non-transitory machine-readable storage medium of claim 31, wherein the at least one parameter adjustment comprises an adjustment to at least one of the following: a cooling rate, a voltage, a clock frequency, and an activation schedule.

* * * * *